W. E. GERTH.
NON-SKIDDING DEVICE FOR WHEELS.
APPLICATION FILED APR. 12, 1912.
1,067,913.
Patented July 22, 1913.
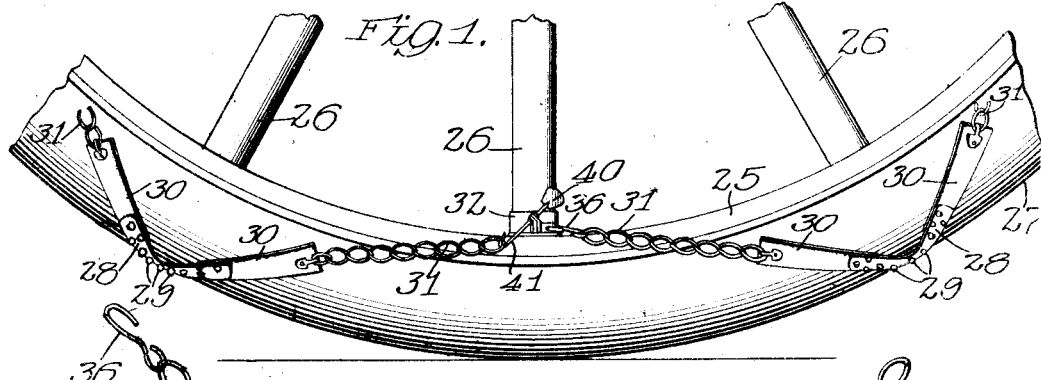
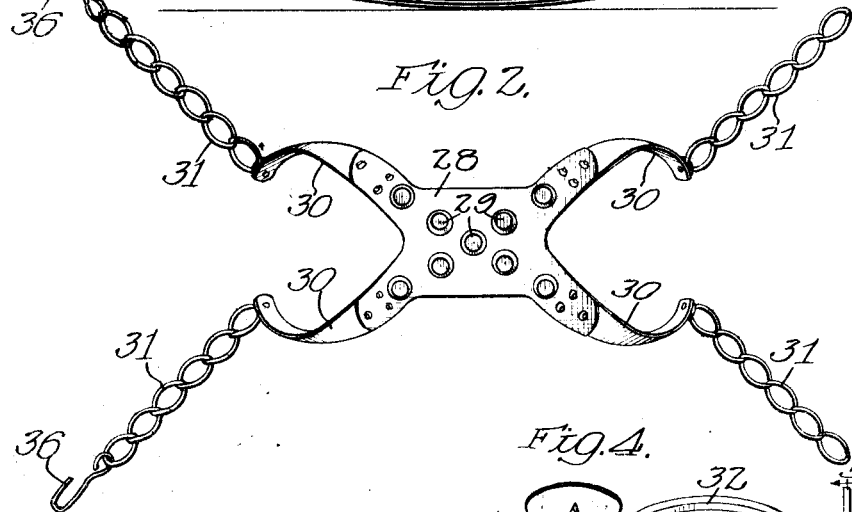
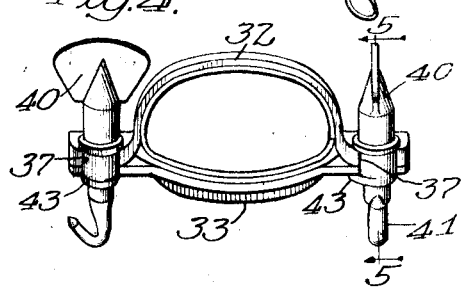
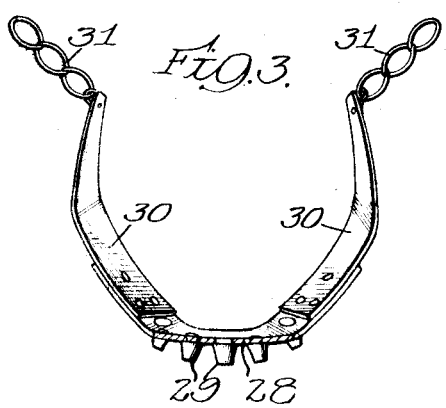
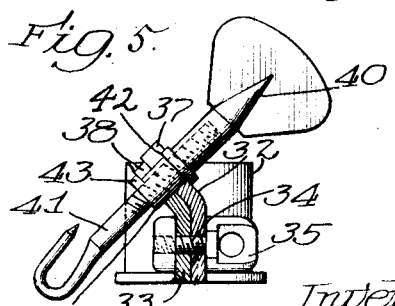
Witnesses:
G. W. Romanus Jr.
E. B. Walmer
Inventor
William E. Gerth
by O. W. Barnett
Att.

UNITED STATES PATENT OFFICE.

WILLIAM E. GERTH, OF CHICAGO, ILLINOIS, ASSIGNOR OF ONE-FOURTH TO JOHN G. GIOMETTI, OF CHICAGO, ILLINOIS.

NON-SKIDDING DEVICE FOR WHEELS.

1,067,913.　　　　　Specification of Letters Patent.　　Patented July 22, 1913.

Application filed April 12, 1912. Serial No. 690,250.

*To all whom it may concern:*

Be it known that I, WILLIAM E. GERTH, a citizen of the United States, residing at Chicago, in the county of Cook and State of Illinois, have invented certain new and useful Improvements in Non-Skidding Devices for Wheels, of which the following is a specification.

My invention relates to means for preventing the wheels of vehicles from slipping or skidding; and the invention has for its object to provide non-skidding means of novel character suitable particularly for the pneumatic tires of motor driven vehicles, which can be readily attached to and detached from the wheel as occasion demands, which can be cheaply manufactured, and which will take a firm grip on the pavement so as to effectually prevent the slipping or skidding of the wheel when the pavement is wet or muddy.

A further important object of the invention is to provide a non-skidding device having a certain capacity for adjustment so that it can be made to accurately fit tires which may be somewhat different in size or inflated to a greater or less degree.

A further object of the invention is to provide a device of this character which can be attached to the wheel and removed therefrom by a very few manipulations requiring but little time and without demounting the wheel.

A further object is to provide non-skidding means consisting of a number of separate devices which are separately arranged on the wheel so that a greater or less number may be used according to the size of the particular wheel or the amount of the peripheral surface of its tire which, under any particular circumstances, it is found necessary to cover.

A further object of the invention, is to provide non-skidding devices which will protect the tires on which they are used instead of injuring them and causing them to wear out as do most of the non-skidding devices heretofore used.

The invention is illustrated, in certain preferred embodiments, in the accompanying drawings wherein—

Figure 1 is a view in elevation of a part of a vehicle wheel showing the tire provided with one form of non-skidding device constructed in accordance with my invention; Fig. 2, a plan view of one of the devices shown in Fig. 1; Fig. 3, a cross sectional view of the same; Fig. 4, a plan view of one of the anchoring devices used for securing the non-skidding devices to the wheel; and Fig. 5, a sectional view taken on line 5—5 of Fig. 4, looking in the direction of the arrows.

Like characters of reference indicate like parts in the several figures of the drawings.

Referring first to Figs. 1 to 5 inclusive, 25 designates the felly of an automobile wheel, 26 the spokes and 27 the tire.

The non-skidding means provided by my invention consists of a number of metal elements which fit around the tire and are detachably secured to the wheel, for example, to the spokes. The device shown in Figs. 1, 2 and 3 consists of a rigid curved metal plate 28 to which are riveted the preferably tool steel studs 29. The plate 28 is provided with four curved arms 30 which are preferably of some flexible material such as spring steel. By making the non-skidding device, or portions of it, flexible the device has the capacity to fit tires which are somewhat different in size and shape or which are not uniformly inflated. To the ends of the arms 30 are secured chains 31 which may be covered, if desired, with any suitable material. When the non-skidding devices are in place on the tire the chains are engaged with anchoring devices which are fixed to the wheel, for example, to the spokes. Preferably these anchoring devices are not removed from the wheel when the non-skidding devices are removed. I have shown one of the anchoring devices in detail in Figs. 4 and 5. It consists of two clamping members 32 and 33 which embrace the spoke and are secured together by the bolts 34. The latter may be formed with rings or eyelets 35 to receive the hooks 36 on the chains 31 at one end of the non-skidding device. The clamping members 32 and 33 are formed at each end with lugs 37, 38 slotted to receive the shank 39 of the thumb screw 40. The latter has an internal thread which receives the threaded stem of a hook 41. The shank 39 is formed, in each case, with a collar 42 and a lug 43. The shank of the thumbscrew can be slipped into the slot in lugs 37, 38 when the lug 43 is alined with the slot. By turning the thumbscrew so as to bring the lug 43 under lug 38 the thumb screw is held in place. The chains 31 at one end of the non-skidding device (the right hand end, Fig. 2) are hooked into the hooks 41. The threaded engagement between the thumb screws and the hooks allows for taking up the slack so that the non-skidding device may be drawn up tight against the tire.

It will be understood that the anchoring devices, as they have been termed, are ordinarily not removed from the wheel after they have been once put in place.

When the non-skidding devices are to be used they are slipped over the tire and the hooks 36 engaged with the eyelets 35 on one of the anchoring devices and the chains at the other end of the non-skidding device engaged with the hooks 41 of the next adjacent anchoring device. By turning the thumbscrews 40 the non-skidding devices may be tightly bound to the wheel.

The number of devices used on the wheel may be varied according to the size of the wheel or the need of covering or protecting more or less of the tire.

A very desirable feature of my invention is that the devices do not wear and injure tires as do the ordinary chain skids. As a matter of fact they protect it.

By making the tread plate 28 forked at each end as shown and arranging the arms or bands 30 so that they extend diagonally around the tire the danger that the device will catch on an obstruction in the road is minimized.

While I have described my invention in a certain preferred embodiment, it will be readily understood that modifications might be made without departure from the invention. Therefore I do not limit myself to the particulars described and claimed except so far as they are made specifically limitations on certain of the claims herein.

I claim:

1. A non-skidding device for a pneumatic tire comprising a metal tread plate, the interior surface of which is smooth and the exterior surface furnished with studs, said tread plate being provided with thin, flexible strips of metal extending diagonally around the tire, and adjustable, flexible, non-elastic means for anchoring the ends of said strips to the wheel on which said tire is mounted.

2. A non-skidding device for a pneumatic tire comprising a metal tread plate forked at each end, the interior surface of which is smooth and the exterior surface furnished with studs, thin, flexible strips of metal secured to the forked ends of said tread plate, two at each end of the plate, which extend diagonally around the tire, and adjustable, flexible, non-elastic means for anchoring the extremities of said strips to the wheel on which said tire is mounted.

3. A non-skidding device for a pneumatic tire comprising a rigid metal tread element which is curved to fit the curvature of the tire, the interior surface of which is smooth and the exterior surface furnished with studs, thin, flexible strips of steel secured to said element, two at each end, which extend diagonally around the tire, and adjustable, flexible, non-elastic means for anchoring said strips to the wheel on which said tire is mounted.

WILLIAM E. GERTH.

Witnesses:
P. H. TRUMAN,
L. A. FALKENBERG.

screw is held in place. The chains 31 at one end of the non-skidding device (the right hand end, Fig. 2) are hooked into the hooks 41. The threaded engagement between the thumb screws and the hooks allows for taking up the slack so that the non-skidding device may be drawn up tight against the tire.

It will be understood that the anchoring devices, as they have been termed, are ordinarily not removed from the wheel after they have been once put in place.

When the non-skidding devices are to be used they are slipped over the tire and the hooks 36 engaged with the eyelets 35 on one of the anchoring devices and the chains at the other end of the non-skidding device engaged with the hooks 41 of the next adjacent anchoring device. By turning the thumbscrews 40 the non-skidding devices may be tightly bound to the wheel.

The number of devices used on the wheel may be varied according to the size of the wheel or the need of covering or protecting more or less of the tire.

A very desirable feature of my invention is that the devices do not wear and injure tires as do the ordinary chain skids. As a matter of fact they protect it.

By making the tread plate 28 forked at each end as shown and arranging the arms or bands 30 so that they extend diagonally around the tire the danger that the device will catch on an obstruction in the road is minimized.

While I have described my invention in a certain preferred embodiment, it will be readily understood that modifications might be made without departure from the invention. Therefore I do not limit myself to the particulars described and claimed except so far as they are made specifically limitations on certain of the claims herein.

I claim:

1. A non-skidding device for a pneumatic tire comprising a metal tread plate, the interior surface of which is smooth and the exterior surface furnished with studs, said tread plate being provided with thin, flexible strips of metal extending diagonally around the tire, and adjustable, flexible, non-elastic means for anchoring the ends of said strips to the wheel on which said tire is mounted.

2. A non-skidding device for a pneumatic tire comprising a metal tread plate forked at each end, the interior surface of which is smooth and the exterior surface furnished with studs, thin, flexible strips of metal secured to the forked ends of said tread plate, two at each end of the plate, which extend diagonally around the tire, and adjustable, flexible, non-elastic means for anchoring the extremities of said strips to the wheel on which said tire is mounted.

3. A non-skidding device for a pneumatic tire comprising a rigid metal tread element which is curved to fit the curvature of the tire, the interior surface of which is smooth and the exterior surface furnished with studs, thin, flexible strips of steel secured to said element, two at each end, which extend diagonally around the tire, and adjustable, flexible, non-elastic means for anchoring said strips to the wheel on which said tire is mounted.

WILLIAM E. GERTH.

Witnesses:
P. H. TRUMAN,
L. A. FALKENBERG.

---

It is hereby certified that in Letters Patent No. 1,067,913, granted July 22, 1913, upon the application of William E. Gerth, of Chicago, Illinois, for an improvement in "Non-Skidding Devices for Wheels," an error appears requiring correction as follows: In the grant and in the heading to the printed specification it is stated that said Gerth assigned "one-fourth" of his right to "John G. Giometti," whereas it should have been stated that he assigned *one-half of his right, title, and interest to John G. Giometti* as shown by the records of assignments in this office; and that the said Letters Patent should be read with this correction therein that the same may conform to the records of the case in the Patent Office.

Signed and sealed this 2d day of September, A. D., 1913.

[SEAL.]

THOMAS EWING,

Commissioner of Patents.

It is hereby certified that in Letters Patent No. 1,067,913, granted July 22, 1913, upon the application of William E. Gerth, of Chicago, Illinois, for an improvement in "Non-Skidding Devices for Wheels," an error appears requiring correction as follows: In the grant and in the heading to the printed specification it is stated that said Gerth assigned "one-fourth" of his right to "John G. Giometti," whereas it should have been stated that he assigned *one-half of his right, title, and interest to John G. Giometti* as shown by the records of assignments in this office; and that the said Letters Patent should be read with this correction therein that the same may conform to the records of the case in the Patent Office.

Signed and sealed this 2d day of September, A. D., 1913.

[SEAL.]

THOMAS EWING,
*Commissioner of Patents.*